(12) United States Patent
Baughman et al.

(10) Patent No.: US 11,184,736 B2
(45) Date of Patent: Nov. 23, 2021

(54) DIGITAL PERSON AND DIGITAL PERSONA VERIFICATION

(71) Applicant: International Business Machines Corporation, Armonk, NY (US)

(72) Inventors: Aaron K. Baughman, Cary, NC (US); Mauro Marzorati, Lutz, FL (US); Shikhar Kwatra, Durham, NC (US); Vinod A. Valecha, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/595,606

(22) Filed: Oct. 8, 2019

(65) Prior Publication Data

US 2021/0105577 A1    Apr. 8, 2021

(51) Int. Cl.
*H04W 4/029* (2018.01)
*H04W 4/80* (2018.01)
*H04W 4/021* (2018.01)
*H04L 29/08* (2006.01)

(52) U.S. Cl.
CPC ............ *H04W 4/029* (2018.02); *H04L 67/18* (2013.01); *H04W 4/021* (2013.01); *H04W 4/80* (2018.02)

(58) Field of Classification Search
CPC ...... H04W 4/029; H04W 16/28; H01Q 1/247; H01Q 3/38
See application file for complete search history.

(56) References Cited

U.S. PATENT DOCUMENTS

| | | | |
|---|---|---|---|
| 7,433,826 B2 | 10/2008 | Korosec | |
| 7,647,500 B2 | 1/2010 | Machiraju et al. | |
| 9,373,201 B2 | 6/2016 | Jefferies et al. | |
| 9,509,703 B1* | 11/2016 | Martin | H04W 4/70 |
| 9,754,338 B2 | 9/2017 | Haparnas et al. | |
| 9,892,637 B2 | 2/2018 | Demisse | |
| 9,902,310 B2 | 2/2018 | Fournier et al. | |

(Continued)

OTHER PUBLICATIONS

Gupta et al., "DriverAuth: A Risk-based Multi-modal Biometric-based Driver Authentication Scheme for Ride-sharing Platforms", Computers & Security, vol. 83, Jun. 2019, doi.org/10.1016/j.cose.2019.01.007, Accepted date: Jan. 23, 2019, 28 pages.

(Continued)

*Primary Examiner* — Muthuswamy G Manoharan
(74) *Attorney, Agent, or Firm* — Daniel M. Yeates

(57) ABSTRACT

Disclosed is a computer implemented method to validate a physical person matches a digital persona. The method includes receiving a first location of a first user based on a global positioning system (GPS) location of a first device, and a second location of a second user based on a GPS location of a second device. The method also includes generating one or more ephemeral keys. The method further includes, determining, based on the GPS location of the first device and the GPS location of the second device, the first user and the second user are in close proximity. The method includes, establishing a short-range communication channel between the first device and the second device. The method includes, validating, based on the one or more ephemeral keys provided over the short-range communication channel, a first person is the first user and a second person is the second user.

17 Claims, 5 Drawing Sheets

(56) References Cited

U.S. PATENT DOCUMENTS

| | | | |
|---|---|---|---|
| 10,009,745 | B2 | 6/2018 | Somani et al. |
| 10,396,985 | B1* | 8/2019 | Nagelberg .......... G06F 21/6245 |
| 2012/0203599 | A1 | 8/2012 | Choi et al. |
| 2016/0149928 | A1* | 5/2016 | Zhang .................... H04L 67/16 726/7 |
| 2016/0292600 | A1* | 10/2016 | Alex ........................ G06N 7/08 |
| 2016/0300242 | A1 | 10/2016 | Truong et al. |
| 2017/0250974 | A1* | 8/2017 | Antonyraj .......... H04L 63/0428 |
| 2018/0332033 | A1* | 11/2018 | Lakhani .................. G06F 21/35 |
| 2019/0065852 | A1 | 2/2019 | Badalamenti et al. |
| 2019/0114638 | A1 | 4/2019 | Flores |

OTHER PUBLICATIONS

Corbett et al., "Who's driving you?" 15th IEEE Annual Consumer Communications & Networking Conference (CCNC), Las Vegas, NV, 2018, 4 pages.

Mettler et al., "A student thought she had gotten into her Uber, police say. Hours later, hunters found her body", The Washington Post, Article, Apr. 2, 8 pages. https://www.washingtonpost.com/crime-law/2019/03/31/she-thought-she-had-gotten-into-her-uber-police-say-hours-later-hunters-found-her-body/?noredirect=on&utm_term=.8facd642fe10.

Moorhead, "Airbnb hosts reveal horror scenarios they've returned home to", News, The Sun, Apr. 7, 2016, 3 pages. https://www.news.com.au/travel/travel-updates/incidents/airbnb-hosts-reveal-horror-scenarios-theyve-returned-home-to/news-story/b50a5d0d45bf4498404406b1314cbc9c.

Bernot, "How UberEats drivers could use a loophole to eat customers' food", The Takeout, Dec. 5, 2018, 3 pages. https://thetakeout.com/ubereats-drivers-loophole-steal-eat-food-1830879242.

Karlis, "An Uber rider, slain when she got in the wrong car, prompts a struggle to regulate rideshare signage", salon, Apr. 3, 2019, 3 pages. https://www.salon.com/2019/04/03/an-uber-rider-slain-when-she-got-in-the-wrong-car-prompts-a-struggle-to-regulate-rideshare-signage/.

"Uber releases new safety features after South Carolina student killed", ABC 7 Eyewitness News, Apr. 18, 2019, 3 pages. https://abc7chicago.com/uber-releases-new-safety-features/5258850/.

Mell et al., "The NIST Definition of Cloud Computing", Recommendations of the National Institute of Standards and Technology, Sep. 2011, Special Publication 800-145, 7 pages.

* cited by examiner

DIGITAL PERSON AND DIGITAL PERSONA VERIFICATION

BACKGROUND

The present disclosure relates to digital transaction, and, more specifically, to validating the correct parties are participating in two party transactions.

The gig economy has led to the creation of many new business models where two parties can facilitate an exchange of goods and/or services ad-hoc. Example include ridesharing, room sharing, and food delivery services, among others. This class of business is predicated on the ability to transfer trust from the digital realm to the physical realm. Namely, that the two persons meeting to perform the transaction are the same entities with which each person was previously digitally conversing.

SUMMARY

Disclosed is a computer implemented method to validate a physical person matches a digital persona. The method includes receiving a first location of a first user based on a global positioning system (GPS) location of a first device, and a second location of a second user based on a GPS location of a second device. The method also includes generating one or more ephemeral keys. The method further includes, determining, based on the GPS location of the first device and the GPS location of the second device, the first user and the second user are in close proximity. The method includes, establishing, in response to the first user and the second user being in close proximity, a short-range communication channel between the first device and the second device. The method further includes, validating, based on the one or more ephemeral keys provided over the short-range communication channel, a first person is the first user and a second person is the second user. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
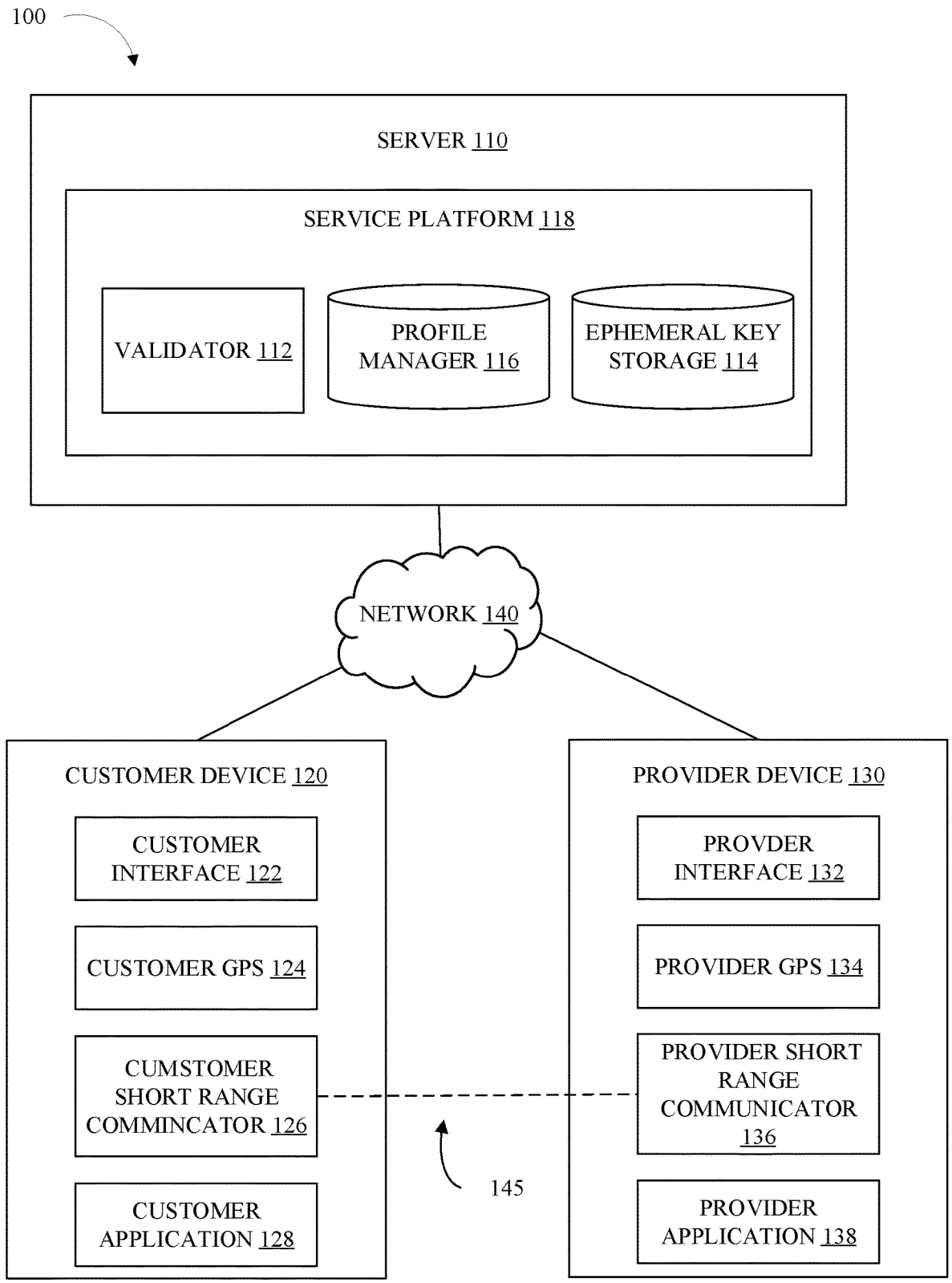
FIG. 1 illustrates a functional diagram of a computing environment suitable for operation of identity verification service, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to digital transaction, and, more specifically, to validating the correct parties are participating in a two-party transactions. Aspects of the present disclosure may be better appreciated in light of the aforementioned applications.

The gig economy has led to the creation of many new business models where two parties (e.g., people, corporations, etc.) can facilitate an exchange of goods and/or services ad-hoc. Examples of the gig economy include ridesharing (e.g., Uber®) and room sharing (e.g., AirBnB®), food delivery services, among others. This class of business is predicated on the ability to transfer trust from the digital realm to the physical realm—namely, that the two persons meeting to perform the transaction are the same entities with which each person was previously digitally conversing.

Occasionally, after a service links a service customer to a service provider, the transaction does not occur as planned. For example, after an event with a large number of people (e.g., concert, sporting event, etc.) multiple attendees may be attempting to utilize a ridesharing service. It may be difficult for each passenger to find their driver assigned by the rideshare service. It is possible for a passenger to get into the wrong car, even when information about the physical persons are exchanged (e.g., car color, passenger names, etc.). Many passengers may have the same or similar names, darkness may make it difficult to determine the color of a car, the same model of care may be driven by multiple providers, etc. In some scenarios, bad actors can take advantage of the digital services and pose as one of the members of a transaction, putting the involved persons in physical and financial danger.

Embodiments of the present disclosure provide capability to determine that the physical person of the second party matches the digital persona of the second party in a transaction. As the confidence that a physical and digital persona are linked increases, the likelihood of errors, and correspondingly, the risks of loss (e.g., wasted time, refunding customers, depleting resources, etc.) decrease. This may be performed by interaction between to the two parties and/or by interaction of the two parties with the service server (server). As the risk of loss decreases, service providers, and service platforms may provide different and better services, may be willing to accept liabilities, and/or the entire cost of providing the service may decrease. In some embodiments, the identities of the two parties are validated using probabilities and/or Mandelbrot spaces. For example, the probability, based on a plurality of evidence, that the two parties interacting are the same two parties that were linked by a digital service, can be transformed into a Mandelbrot space and/or a fractal. If the result of the calculations include a bounded set (or fall within a Mandelbrot space), then that may signify the two parties interacting were not paired by the service. A Mandelbrot space, or Mandelbrot set, is a set of numbers for which the set does not diverge when iterated in the function $f(x)=x^2+c$.

In some embodiments, the validation service can confirm a user (where a user may be a customer or a provider) is interacting with the physical person corresponding to specific digital persona. The digital persona may be the person selected to perform the other half of a two-party transaction.

Embodiments of the current disclosure verify a person is authorized to use to utilize a service. Each person creates and maintains a unique profile within the service. Each profile may contain a unique and permanent identifier(s). The identifier may be an identification number (e.g., account number, social security number, driver's license number, etc.), an email address, a phone number, etc. A person, either a provider or a customer, is able to access the profile to obtain access to the service. The profile will contain data that indicates which part of the service the person is authorized to access (e.g., one person may be a passenger for a rideshare service, while another is a passenger and a driver). In some embodiments, the profile is connected by one or more permanent keys (e.g., password, biometric data, etc.)

In some embodiments, the user devices connect via a short-range communication channel. The shortrange channel may be independent of the network that initially paired the two parties. The shortrange range communication channel can be any method of communication between two devices. This may include Bluetooth, infrared waves, short wave radio waves, WiFi®, and other similar communication methods.

In some embodiments, the short-range communication channel is opened in response to the two parties being in close proximity to one another. In some embodiments, a global positioning service (GPS) is used to identify the locations of the two parties. Various factors can determine when two parties are in proximity. The factors may include a predefined distance, a time such as an estimated arrival time, an indication from one or both parties of the belief the other party is close, and other similar factors.

Embodiments of the present disclosure generate one or more ephemeral keys for each user. The ephemeral keys may be stored in the service database or on a local device. In some embodiments, the ephemeral key is generated by the service. In some embodiments, the ephemeral key is generated by a user. In some embodiments, the ephemeral keys are generated by a combination of the service and the users. In some embodiments, the ephemeral key is passed between the users on the short-range communication channel. This way, each user can be confident, (and this leads to a higher probability in the calculations) that the person they are conversing with is associated with the appropriate digital persona to perform the transaction.

Embodiments of the present disclosure unlock the services in response to validating the correct users are involved. In some embodiments, the service may notify the users that validation did not occur.

The aforementioned advantages are example advantages, and embodiments exist that can contain all, some, or none of the aforementioned advantages while remaining within the spirit and scope of the present disclosure.

Referring now to various embodiments of the disclosure in more detail, FIG. 1 is a representation of a computing environment 100, that is capable of running a service platform, in accordance with one or more embodiments of the present disclosure. Many modifications to the depicted environment may be made by those skilled in the art without departing from the scope of the disclosure as recited by the claims.

Computing environment 100 includes server 110, customer device 120, provider device 130, and network 140. In some embodiments, computing environment 100 is consistent with the cloud computing environment of FIG. 4. Network 140 can be, for example, a telecommunications network, a local area network (LAN), a wide area network (WAN), such as the Internet, or a combination of the three, and can include wired, wireless, or fiber optic connections. Network 140 may include one or more wired and/or wireless networks that are capable of receiving and transmitting data, voice, and/or video signals, including multimedia signals that include voice, data, and video information. In general, network 140 may be any combination of connections and protocols that will support communications between server 110, customer device 120, provider device 130, and other computing devices (not shown) within computing environment 100.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In some embodiments, server 110 represents a computing system utilizing clustered computers and components (e.g., database server computers, application server computers, etc.) that act as a single pool of seamless resources when accessed within computing environment 100.

In some embodiments, server 110 is configured to exchange data with a plurality of clients (e.g., customer device 120). In some embodiments server 110 includes service platform 118.

Service platform 118 can be any combination of hardware and/or software configured to perform a service. The service may digitally link a service customer, and a service provider. For example, service platform 118, may include a ridesharing application. The service customer, such as a passenger, will request a ride from point A to point B, service platform 118 will then find a service provider, such as a driver, to perform the service. At this point the two persons are digitally linked.

In some embodiments, service platform 118 assists in confirming the physical person of the person matches the digital persona. In some embodiments, service platform 118 includes validator 112, ephemeral key storage 114, and profile manager 116.

Profile manager 116 can be any combination of hardware and/or software configured to manage customer profiles. In some embodiments, each user on service platform 118 has a unique profile. Each profile may contain a unique and permanent identifier(s). The identifier may be an identification number (e.g., account number, social security number, driver's license number, etc.), an email address, a phone number, username, and/or other similar data. In some embodiments, the permanent identifier can be updated (e.g., replacing an old phone number with a new phone number). In some embodiments, the profile includes what portions of the service a person may access, (e.g., a passenger). In some embodiments, a person may use a single profile to be a service use and a service provider, while in some embodiments, a person may have a unique profile as a service customer, and a separate profile as a service provider.

In some embodiments, profile manager 116 authenticates a user's access to a user profile. The authentication may include, permanent keys (e.g., password, passphrase, passcode, etc.), temporary keys (one-time use passwords), and/or biometrics (e.g., fingerprint, retinal scan, voice recognition, facial recognition, body structure, etc.).

Ephemeral key storage 114 can be any combination of hardware and/or software configured to generate and store ephemeral keys. An ephemeral key is a digital key (secret answer) that is short term, where short term may be, e.g., for use in one transaction/validation. In some embodiments, the ephemeral key includes multiple parts. One part may be a challenge, and another part a response to the challenge. In some embodiments, the key is stored as a hash tree.

In some embodiments, an ephemeral key generator generates the ephemeral keys for storage. One or more ephemeral keys can be used for each party in each transaction. In some embodiments, the ephemeral key is generated by requesting the key from the parties (e.g., service customer, service provider, etc.). The request may be in the form of a question that the recipient would easily answer. One question may be "what did you have for lunch today?" Or, the request may say "say any 5-word sentence". In response to the request, the party may enter a response that is returned to and stored in ephemeral key storage 114.

In some embodiments, the ephemeral keys are generated by a true random number (TNRG) generator, pseudorandom number generator, or by other ways of making keys. There are devices that generate random numbers from a physical process, rather than a computer program. The TRNG can be based on microscopic phenomena that generate low-level, statistically random "noise" signals. Some aspect of the microscopic phenomena can be converted to an electrical signal, and the output can be converted to a digital number. The TRNG can generate a series of random numbers by repeated sampling of the varying signal. In other embodiments, the TRNG can be replaced by software random number generation, such as a pseudorandom number generator, or other techniques for generation of random numbers.

In some embodiments, the ephemeral key is generated by ephemeral key storage 114. The ephemeral key may be a symmetric key and/or an asymmetric key. The generated key may then be sent to either or both parties to be validated at a local level.

Validator 112 can be any combination of hardware and/or software configured to provide validation that the physical person participating in the transaction is the person linked to the digital persona. In some embodiments, validator 112 throws challenge requests to one or more parties of the transactions. The challenge may be part of the ephemeral key.

In some embodiments, validator 112 notifies one or both parties when validation is not successful. For example, validator 112 may send a push notification to a service customer saying, "do not enter this vehicle." In some embodiments, validator calculates the probability the digital persona matches the physical person. In some embodiments, validator 112 determines a fit of a parabolic function to validate the identity of the users. In some embodiments, validator 112 uses a Mandelbrot set and/or fractals to detect a converging set. If a set is converging and/bounded that indicates the two parties interacting are not a correct match. In some embodiments, the equation used to determine a diverging set is $f(x)=x^2+c$ where the result f(x) is used as x in the subsequent calculation, and c is a constant.

In some embodiments, Bayes formula is used to determine values for x and c. Bayes formula describes the probability of an event, based on prior knowledge of conditions that may be related to an event. For example, knowledge of an ephemeral key by a driver may indicate a match with the associated passenger is more likely correct. Bayes formula has the general form of $$p(c_k | x) = \frac{p(c_k)p(x | c_k)}{p(x)}$$

where p(c$_k$|x) represents the probability that the match, or the second person in the transaction, is correct (c$_k$) based on the evidence (x). The evidence may include ephemeral keys, permanent keys, biometric data, physical data (e.g., make and model of car, address of a rental property), and other similar evidence.

The value for x may be determined by applying a step function for each piece of evidence such that $$p(c_k | x) = \left\{ \begin{array}{l} z_i \geq 0.5 : 1 \\ z_i < 0.5 : -1 \end{array} \right\}$$

and then averaging each probability together with $$x = \frac{1}{N} \sum_i^N z_i$$

The constant c may be determined by taking all pieces of evidence into account by applying $$p(c_k | x_1 \ldots x_n) = \frac{p(c_k)p(x_1 \ldots x_n | c_k)}{p(x_1 \ldots x_n)}$$

then applying a threshold for the value of the model output where $$c = p(c_k | x_1 \ldots x_n) = \left\{ \begin{array}{l} y_i \geq 0.5 : 1 \\ y_i < 0.5 : -1 \end{array} \right\}$$

Customer device 120 can be any computing device capable of operating a customer application (e.g., customer application 128). Customer device 120 may include one or more programs configured to operate on a data processing system. The data processing systems may include client computing devices, server computing devices, a tablet computer, laptop computer, telephone or other communication device, a personal digital assistant (PDA), or the like. In some illustrative examples, the customer device 120 a portable computing device that is configured with flash memory to provide non-volatile memory for storing operating system files and/or customer-generated data, for example. Thus, the customer device 120 may essentially be any known or later-developed data processing system without architectural limitation. In some embodiments, customer device 120 includes customer interface 122, customer GPS 124, customer short-range communicator 126, and customer application 128.

Customer interface 122 can be any combination of hardware and/or software that allows a user to input and receive data from customer device 120. In some embodiments, customer interface 122 includes visual, audio, and/or haptic input and output. This may include a screen for viewing information, which may include a method of inputting data (e.g., keyboard, touch screen, etc.). Audio may include microphones and/or speakers. Haptic devices may include a vibrator, touchscreen, accelerometer, gyroscope, and/or other components that may detect and/or cause movement.

Customer GPS 124 can be any combination of hardware and/or software configured to identify to location of customer device 120. Customer GPS 124 can be integrated into or separate from service application 128.

Customer short-range communications 126, can be any combination of hardware and/or software configured to communicate with different computing devices. In some embodiments, customer short-range communications 126 can transmit data between devices independent of network 140. In some embodiments, customer short-range communications 126 can generate and receive radio signals over a relatively short distance. Short-range can e.g., be any distance up to about 10 meters. The short-range distance must be sufficient to allow for the exchange of information between two parties without needing network 140—for example, a passenger for a rideshare service while still outside the vehicle. Customer short-range communications 126 may include Bluetooth®, Wi-Fi®, infrared transmissions, and other similar short-range communications. In some embodiments, customer short-range communications become active in response to customer GPS 124 indicating the service provider is in the area (e.g., in close proximity). The close proximity may be determined by receiving location information of provider device 130 from service platform 118 and/or provider device 130.

Customer application 128 can be any combination of hardware and/or software configured to allow for utilization of service platform 118. In some embodiments, customer application 128 communicates with service platform 118 via network 140. In some embodiments, customer application 128 uses application programing interfaces (API) to transfer data to and from service platform 118.

Provider device 130 can be any computing device capable of operating a provider application 138). In some embodiments, provider device 130 includes provider interface 132, provider GPS 134, and provider short range communications 136. In some embodiments, provider device 130 is consistent with customer device 120. In some embodiments, provider device 130 includes provider interface 132, provider GPS 134, provider short-range communicator 136, and provider application 138. In some embodiments, provider interface 132, provider GPS 134, provider short-range communicator 136, and provider application 138 are consistent with counterpart components in customer device 120.

In some embodiments, computing environment 100 includes a short-range network 145. The short-range network 145 allows for communication between customer device 120 and provider device 130 independent of network 140. The short-range network 145 may be established between customer short-range communicator 126, and provider short-range communicator 136.

Figure 2:
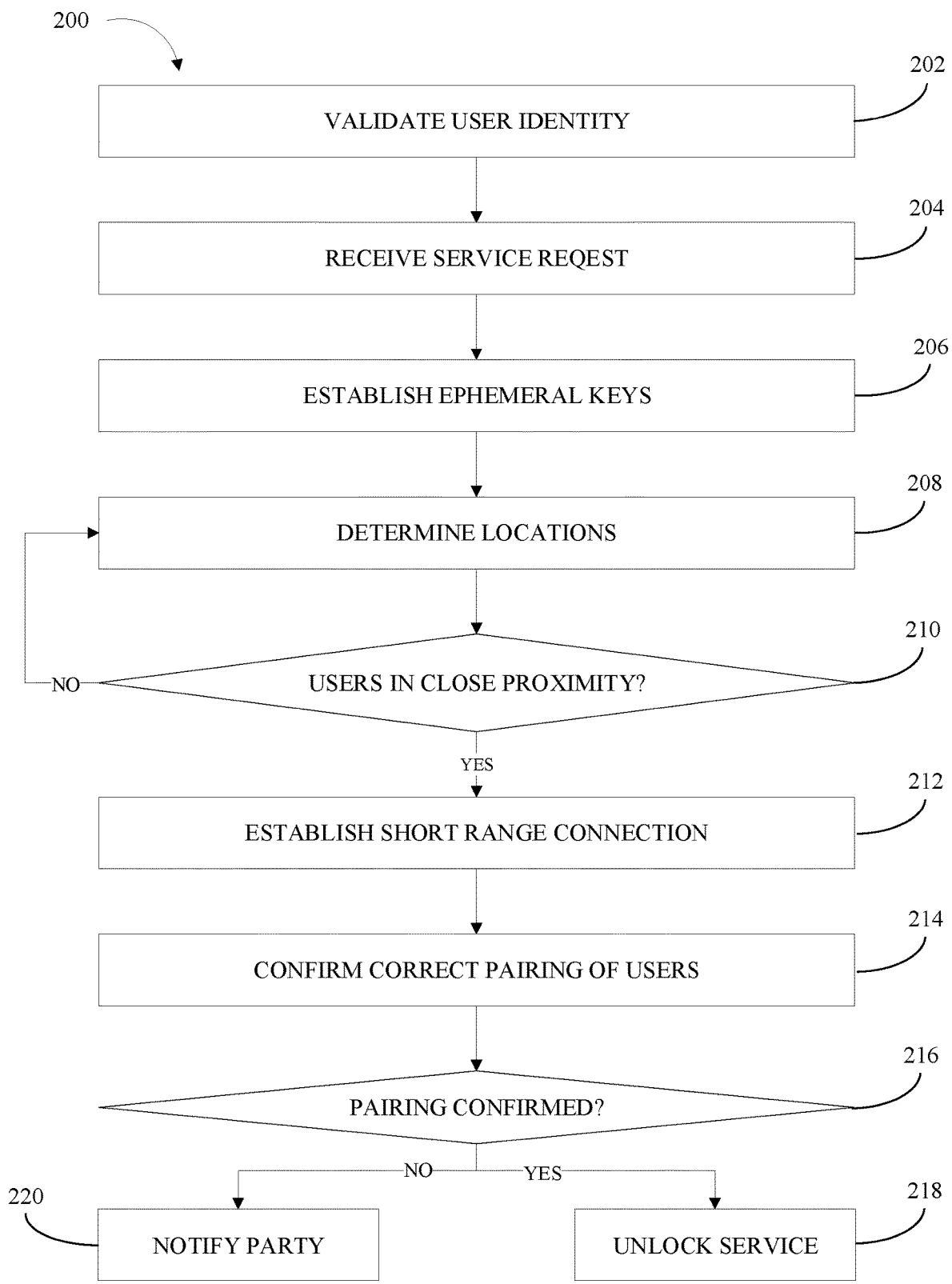
FIG. 2 illustrates a flow chart of an example method to validate the identity of parties in a transaction, in accordance with some embodiments of the present disclosure.

FIG. 2 depicts a flowchart of an example method 200, for validating a physical person is linked to a specific digital persona that can be performed in an environment, such as computing environment 100 and/or server 110. One or more of the advantages and improvements described above for verifying physical person matches a digital persona can be realized by the method 200, consistent with various embodiments of the present disclosure.

Method 200 can include more or fewer operations than those depicted. Method 200 can include operations in different orders than the order depicted. Likewise, the method 200 can include operations that occur simultaneously rather than sequentially. Many modifications to the depicted method may be made by those skilled in the art without departing from the spirit and scope of the present disclosure. Method 200 will be described as being mostly performed by service platform 118. However, in various embodiments, method 200 can be implemented by one or more processors, a computing device (e.g., server 110 of FIG. 1), one or more remote computing devices (e.g., customer device 120, provider device 130, etc.), and/or a different combination of hardware and/or software. In various embodiments, the various operations of method 200 are performed by one or more of the components or subcomponents of FIG. 1.

At operation 202 service platform 118 validates user identity. In some embodiments, the identity of both the customer and the provider are validated. In some embodiments, each user, prior to validation, has a user profile. The profile data may be stored in profile manager 116.

In some embodiments, user identity is validated by having the user login. For example, the user may enter an account identifier (e.g., username, email address, etc.) and an associated key. The key may be a password, a passkey, and/or other similar data. In some embodiments, validation includes biometric identification (e.g., facial recognition, fingerprint recognition, etc.).

At operation 204, service platform 118 receives a service request. A service request is a customer requesting the service provided by service platform 118. In some embodiments, a customer initiates the service request through passenger application 128. The request may be initiated through passenger interface 122 on passenger device 120.

In some embodiments, operation includes pairing a customer with a provider. Service platform 118, can analyze the request and pass the request on to a provider. The provider may accept the request. The acceptance may be provided by an input into provider device 130.

At operation 206, service platform 118 establishes ephemeral keys. In some embodiments, the ephemeral keys are established by sending a challenge (or prompt) to the users. The users may respond to the challenge which may be part of the ephemeral key.

In some embodiments, the ephemeral key is generated by service platform 118, and/or ephemeral key storage 114. Each transaction (pairing of a customer and a provider) may have a unique set of ephemeral keys. In some embodiments, the ephemeral keys are stored in ephemeral key storage 114.

At operation 208, service platform 118 determines the location of each user. In some embodiments, the location is determined by receiving location data from the user devices (e.g., customer device 120 and provider device 130). In some embodiments, the locations are used in operation 204 to pair a customer with a provider. In some embodiments, the locations are determined by a GPS (e.g., customer GPS 124, etc.).

At operation 210, service platform 118 determines if the users are in close proximity. In some embodiments, the users are in close proximity if there are within a predetermined distance (e.g., 25 yards). In some embodiments, the predetermined distance may be selected based on the usable range of the short-range communicators used by the devices. The distance may be calculated based on the locations of the user devices. In some embodiments, the users are determined to be in close proximity based on an input from one of the users. For example, a driver (provider) and/or a user may tap a button to indicate they have arrived at a pickup location. Service platform 118 can consider the user in close proximity in response to receiving one or both of those indications. In some embodiments, the users may be determined to be in close proximity based on time. The time may be measured from a specific starting point (e.g., 10 minutes after the service request is received), or based on time of day (e.g., 6:30 P.M.). If the users are determined to be in close proximity (210:YES), service platform 118 proceeds to operation 212. If the users are determined not to be in close proximity (210:NO), service platform 118 returns to operation 208.

In some embodiments, method 200 ends if the users are not in close proximity for a predetermined period of time. For example, the system can time out and/or cancel the service request 10 minutes after an estimated arrival time. In some embodiments, the customers and/or the provider can cancel the service request.

At operation 212, service platform 118 establishes a short-range connection between the two devices. In some embodiments, service platform 118 notifies the user devices to connect. In some embodiments, the connection is established in response to determining the devices are in close proximity.

In some embodiments, the connection is independent of the connection between server 110, customer device 120 and provider device 130. The independent connection can be any short-range communication method. In various embodiments, the short-range connection is one or more of Bluetooth, infrared, or any other current or later developed technology.

In some embodiments, the connection is established in response to a user input to establish the connection. For example, a passenger may see a vehicle approaching and signal to connect to verify the vehicle contains the correct driver.

At operation 214, service platform 118 confirms the correct pairing of users. In some embodiments, the correct pairing is confirmed by validator 112. A correct pairing is the physical and digital personal of the customer and the provider correctly paired both physically and digitally to perform the service. In some embodiments, operation 214 includes the physical (non-digital) interaction between the two parties. They may interact by conversation, using visual, audible and/or any other method of interacting.

In some embodiments, the correct pairing is confirmed using the ephemeral keys. In some embodiments, the pairing is confirmed when a customer device receives the ephemeral key from the provider device. The key may be received by the short range connection. This will assist in preventing errors. For example, if two different drivers had a similar car and similar name, but the wrong driver was sending the ephemeral key, the pairing would not be confirmed.

In some embodiments, all or part of the ephemeral key (e.g., the question and/or the answer generated in operation 206) is sent to the user device. The party may then have to input an additional portion of the key into their device to confirm. For example, a driver may receive, through the short range connection, a notification saying the answer is "blueberries." The passenger may ask the driver, "what did I have for lunch today?" The driver has the correct key to confirm the correct pairing. In some embodiments, a user may manually input confirmation into their device. Continuing the above example, once the driver gives the correct answer, the passenger can input a "confirmed" status into their device.

Another example, the driver may receive the question via the short-range connection "what did I have for lunch today?" The driver will then ask the passenger the answer and input blueberries into provider interface 132. The ephemeral key (answer) will then be checked against what is stored in ephemeral key storage 114. Here, the service platform may not have ever received the question, only the key. Thus, transferring the question via the short range network directly from customer device 120 to provider device 130 adds additional confidence the pairing is correct.

In some embodiments, a plurality of the above methods are used to confirm the correct pairing of users. In some embodiments, the pairing is confirmed using probabilities. Each of the factors may be used to calculate the overall probability of the pairing being correct. In some embodiments, the pairing is confirmed if it falls outside the Mandelbrot set. In some embodiments, some or all pieces of data are used to determine the probability of a correct pairing. Each piece of data may include ephemeral keys, permanent keys, location data, profile data (e.g., type of car, color of car, etc.)

At operation 216, service platform 118 determines if the pairing was confirmed. If the correct pairing is confirmed (216:YES), then service platform 118 proceeds to operation 218. If the correct pairing is not confirmed (216:NO), then service platform 118 proceeds to operation 220.

At operation 218, service platform 118 unlocks the service. Unlocking the service may include allowing the transaction to proceed. In some embodiments, unlocking the service includes validating the customer and the provider are the persons linked to the digital personas involved in the transaction. For example, in a ridesharing scenario, it will allow the driver to indicate the passenger has been picked and start charging a fare. Another example, in a room sharing scenario, validation may allow access to a room (e.g., unlock a door). In some embodiments, the users receive a notification on their devices that the service is unlocked and/or the transaction may proceed.

At operation 220, service platform 118 notifies the users. In some embodiments, the notification indicates correct pairing was not confirmed. The notification may be audible, visual (e.g., a push notification, colored border on device, etc.), haptic (e.g., vibrations, etc.), and/or other methods of notification. In some embodiments, the notification includes directions to find the correct pairing. For example, the notification may say, "your driver is approximately 250 yards north." In some embodiments, service platform 118 returns to operation 208, in response to issuing the notification.

Figure 3:
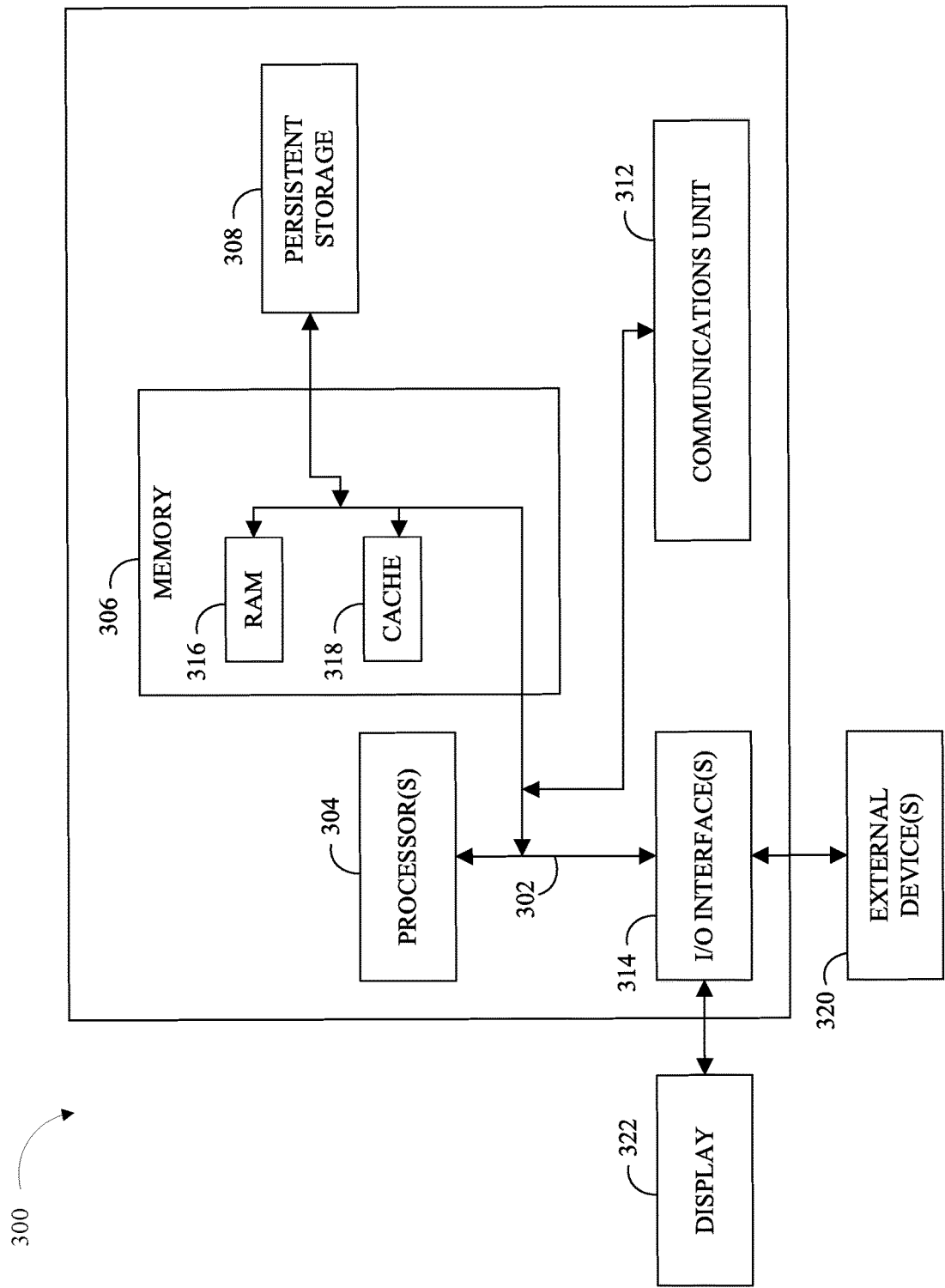
FIG. 3 illustrates a block diagram of an example computer system capable of validating identities of persons participating in an online service.

FIG. 3 is a block diagram depicting components of a computer 300 suitable for validating users of a transaction in accordance with at least one embodiment of the invention. In an embodiment, computer 300 is representative of server 110, customer device 120 and/or provider device 130. FIG. 3 displays the computer 300, one or more processor(s) 304 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with any architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random access memory (RAM) 316 and a cache 318. In general, the memory 306 may comprise one or more of any suitable volatile or non-volatile computer readable storage media.

Program instructions for service platform 118, user customer application 128, provider application 138 and/or other applications may be stored in the persistent storage 308, or more generally, any computer readable storage media, for execution by one or more of the respective computer processors 304 via one or more memories of the memory 306. The persistent storage 308 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
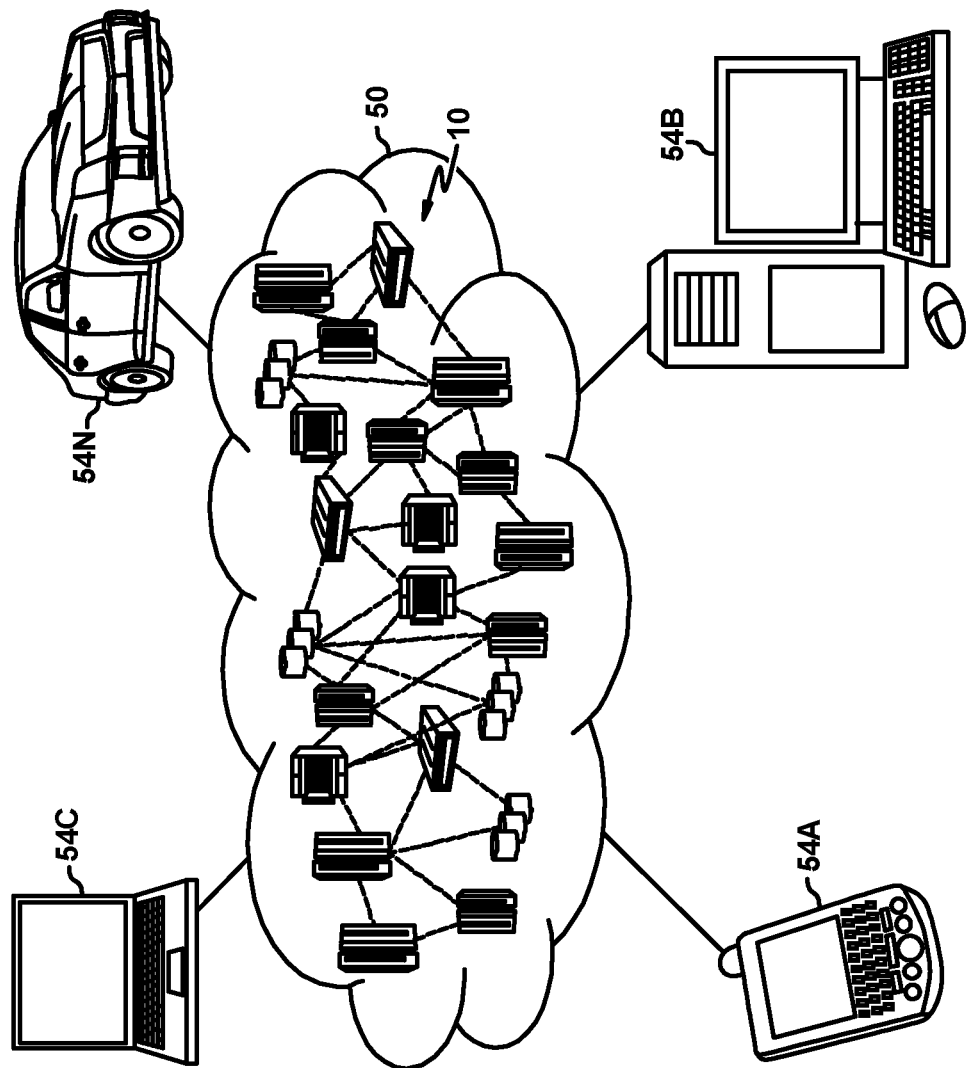
FIG. 4 depicts a cloud computing environment, in accordance with some embodiments of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 5:
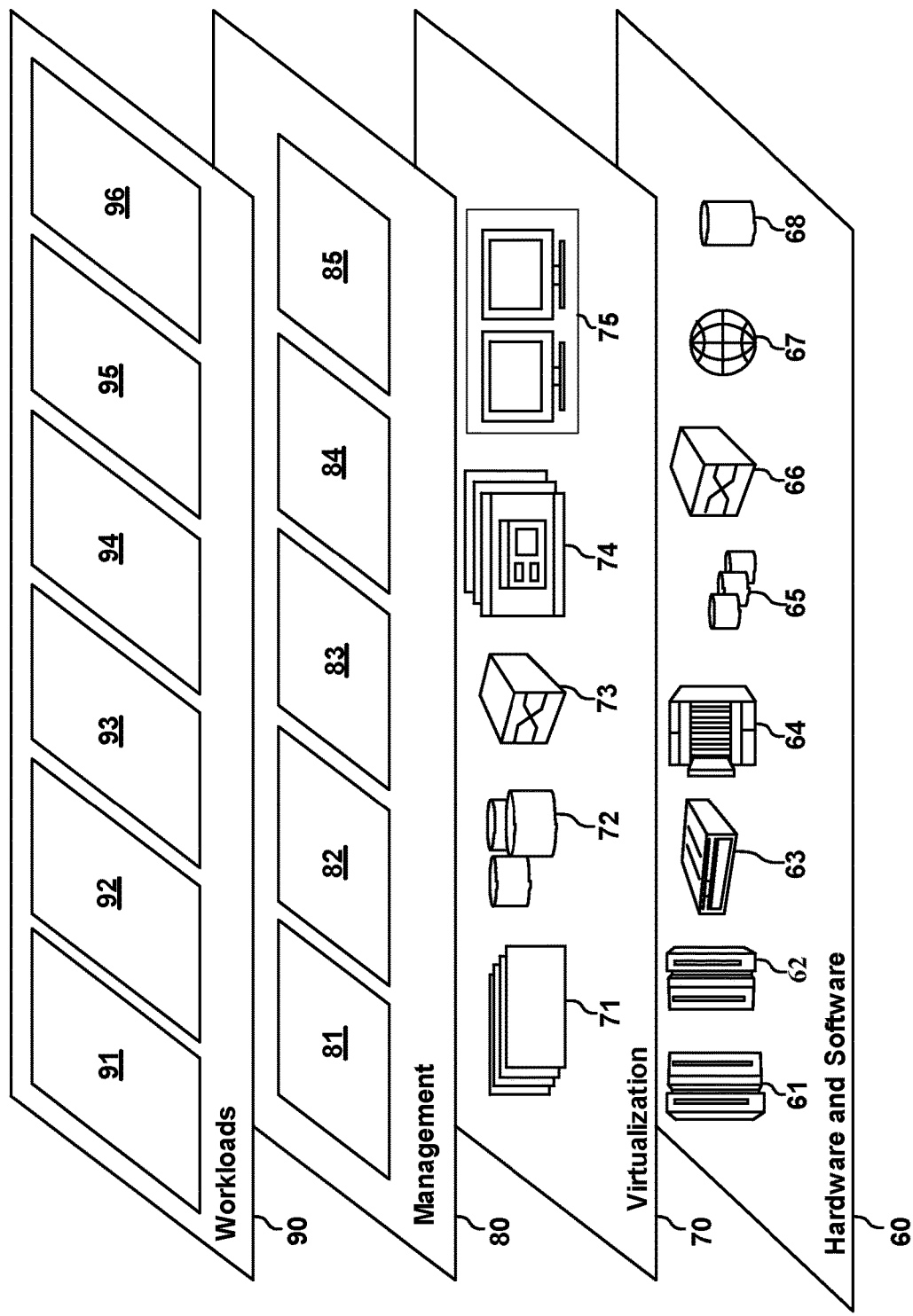
FIG. 5 depicts abstraction model layers, in accordance with some embodiments of the present disclosure.

Referring now to FIG. 5, a set of functional abstraction layers provided by cloud computing environment 50 (FIG. 4) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user validation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, from a first user, a service request;
   selecting a second user to perform the service request;
   receiving a first location of the first user based on a global positioning system (GPS) location of a first device, and a second location of the second user based on a GPS location of a second device;
   generating one or more ephemeral keys including a first ephemeral key by the first device and a second ephemeral key by the second device;
   determining, based on the first and second locations, the first user and the second user are in close proximity;
   establishing, in response to the first user and the second user being in close proximity, a short-range communication channel between the first device and the second device;
   validating, by a service platform, based on the one or more ephemeral keys provided over the short-range communication channel, a first digital persona of a first person is the first user and a second digital persona of a second person is the second user;
   determining, using a set of evidence, the set of evidence falls outside a Mandelbrot set, wherein the set of evidence includes the one or more ephemeral keys transferred over the short-range communication channel; and
   unlocking, in response determining the set of evidence falls outside of the Mandelbrot set, service that allows the second user to complete the service request.

2. The method of claim 1, further comprising:
   validating, prior to selecting the second user, the second person is linked to the second user using one or more permanent keys.

3. The method of claim 2, wherein the one or more permanent keys comprise biometric data, wherein the biometric data is selected from the group consisting of a retinal scan, fingerprints, facial recognition, and body structure.

4. The method of claim 1, wherein generating the one or more ephemeral keys comprises:
receiving, from the first user and in response to the receiving of the service request, the first ephemeral key included in one or more ephemeral keys; and
receiving, from the second user and in response to the receiving of the service request, the second ephemeral key included in one or more ephemeral keys.

5. The method of claim 4, wherein the receiving of the first ephemeral key includes sending a prompt to the first user.

6. The method of claim 5, wherein the validating further comprises:
receiving the first ephemeral key from the second user, wherein the second user received the first ephemeral key from the first device via the short-range communication channel.

7. The method of claim 1, wherein the first user is linked to a first profile, and the second user is linked a second profile, the method further comprising:
transferring, between the first device and the second device, a plurality of data wherein the plurality of data comprises data from the first profile and data from the second profile; and wherein each piece of data is included in the set of evidence.

8. The method of claim 1, wherein the first user and the second user are determined to be in close proximity in response to a distance between the first device and the second device being less than a predefined threshold.

9. The method of claim 1, wherein the first user and the second user are determined to be in close proximity in response the first user indicating via an input into the first device, close proximity to the second user.

10. A system comprising:
a processor; and
a computer-readable storage medium communicatively coupled to the processor and storing program instructions which, when executed by the processor, are configured to cause the processor to:
receive a first location of a first user based on a global positioning system (GPS) location of a first device, and a second location of a second user based on a GPS location of a second device;
generate one or more ephemeral keys including a first ephemeral key by the first device and a second ephemeral key by the second device, wherein the receiving of the first ephemeral key includes sending a prompt to the first user;
determine based on the first and second locations, the first user and the second user are in close proximity;
establish, in response to the first user and the second user being in close proximity, a short-range communication channel between the first device and the second device; and
validate, by a service platform, based on the one or more ephemeral keys provided over the short-range communication channel, a first digital persona of a first person is the first user and a second digital persona of a second person is the second user.

11. The system of claim 10, wherein the program instructions are further configured to cause the processor to:
determine, using a set of evidence, the set of evidence falls outside a Mandelbrot set, wherein the set of evidence includes the one or more ephemeral keys transferred over the short-range communication channel.

12. The system of claim 11, wherein the first user is linked to a first profile, and the second user is linked a second profile and the program instructions are further configured to cause the processor to:
transfer, between the first device and the second device, a plurality of data wherein the plurality of data comprises data from the first profile and data from the second profile; and wherein each piece of data is included in the set of evidence.

13. The system of claim 12, wherein the program instructions are further configured to cause the processor to:
receive, from the first user and in response to receiving a service request, the first ephemeral key included in one or more ephemeral keys.

14. A computer program product, the computer program product comprising a computer readable storage medium having program instructions embodied therewith, the program instructions executable by a processing unit to cause the processing unit to:
receive a first location of a first user based on a global positioning system (GPS) location of a first device, and a second location of a second user based on a GPS location of a second device;
generate one or more ephemeral keys, including a first ephemeral key by the first device and a second ephemeral key by the second device, wherein the receiving of the first ephemeral key includes sending a prompt to the first user;
determine based on the first and second locations, the first user and the second user are in close proximity;
establish, in response to the first user and the second user being in close proximity, a short-range communication channel between the first device and the second device; and
validate, by a service platform, based on the one or more ephemeral keys provided over the short-range communication channel, a first digital persona of a first person is the first user and a second digital persona of a second person is the second user.

15. The computer program product of claim of claim 14, wherein the program instructions are further configured to cause the processing unit to:
determine, using a set of evidence, the set of evidence falls outside a Mandelbrot set, wherein the set of evidence includes the one or more ephemeral keys transferred over the short-range communication channel.

16. The computer program product of claim 15, wherein the first user linked to a first profile, and the second user is linked a second profile, and the program instructions are further configured to cause the processing unit to:
transfer, between the first device and the second device, a plurality of data wherein the plurality of data comprises data from the first profile and data from the second profile; and wherein each piece of data is included in the set of evidence.

17. The computer program product of claim 16, wherein the program instructions are further configured to cause the processing unit to:
request, from the first user and in response to receiving a service request, the first ephemeral key included in one or more ephemeral keys; and
receive the first ephemeral key from the second user, wherein the second user received the first ephemeral key from the first device via the short-range communication channel.

* * * * *